United States Patent [19]

Brill

[11] 4,411,682
[45] Oct. 25, 1983

[54] PROCESS AND APPARATUS FOR PRODUCING COMPOST

[76] Inventor: Joseph H. Brill, 4825 W. Sanilac, Snover, Mich. 48472

[21] Appl. No.: 304,991

[22] PCT Filed: Jan. 14, 1980

[86] PCT No.: PCT/US80/00069
§ 371 Date: Sep. 14, 1981
§ 102(e) Date: Sep. 8, 1981

[87] PCT Pub. No.: WO81/02011
PCT Pub. Date: Jul. 23, 1981

[51] Int. Cl.³ .............................................. C05F 11/08
[52] U.S. Cl. ............................................ 71/9; 71/21; 71/23; 71/5; 422/185; 435/813
[58] Field of Search ................. 71/9, 21, 23; 422/185; 435/287, 813, 818, 819

[56] References Cited

U.S. PATENT DOCUMENTS 3,041,157  6/1962  Crane et al. .............................. 71/9

FOREIGN PATENT DOCUMENTS 2251582  4/1973  Fed. Rep. of Germany .......... 71/21

*Primary Examiner*—Ferris H. Lander
*Attorney, Agent, or Firm*—Krass, Young & Schivley

[57] ABSTRACT

A process and apparatus for producing compost having a high nutrient value from a mixture of moist, at least partially particulate organic matter containing aerobic bacteria. The composter has two parallel shafts (24,26) with radially projecting fingers (38) which, when the shafts are rotated, slowly and gently churn and agitate the mixture in the composting chamber (10) while air is directed therethrough at a predetermined low rate. When the composting action is completed the compost is promptly dried and packaged in moisture impervious containers.

10 Claims, 4 Drawing Figures

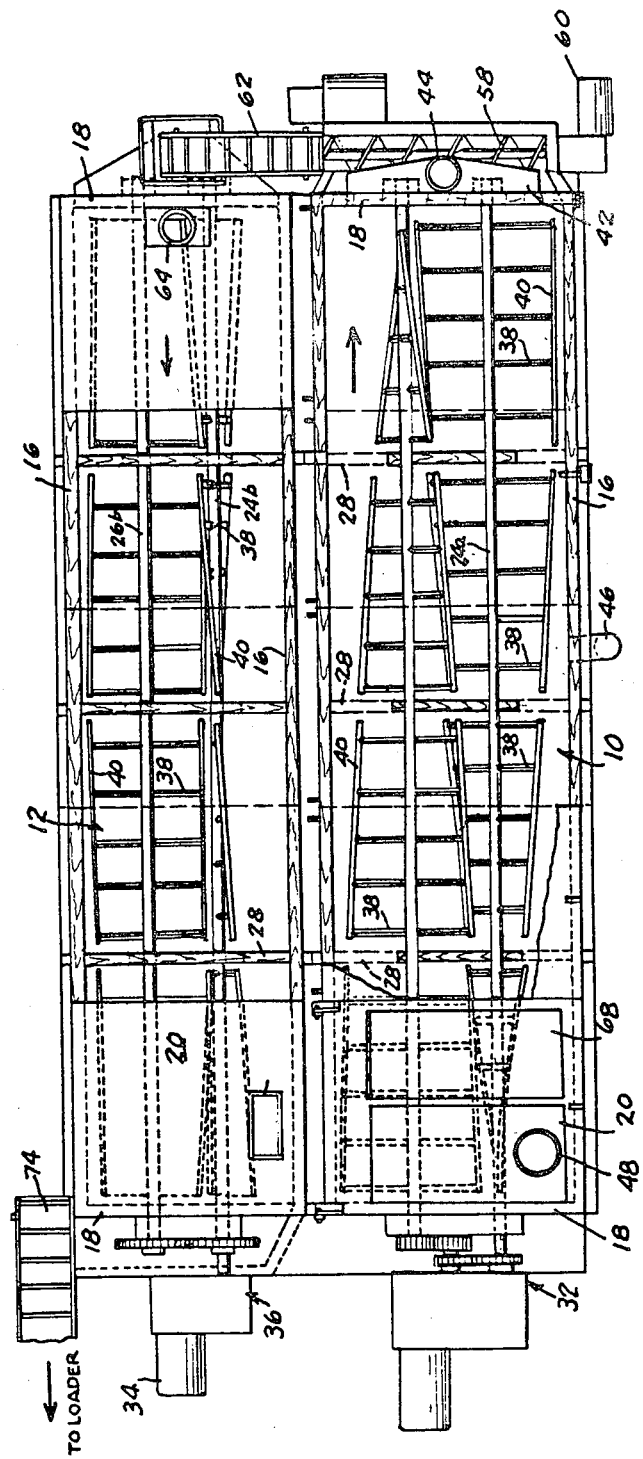

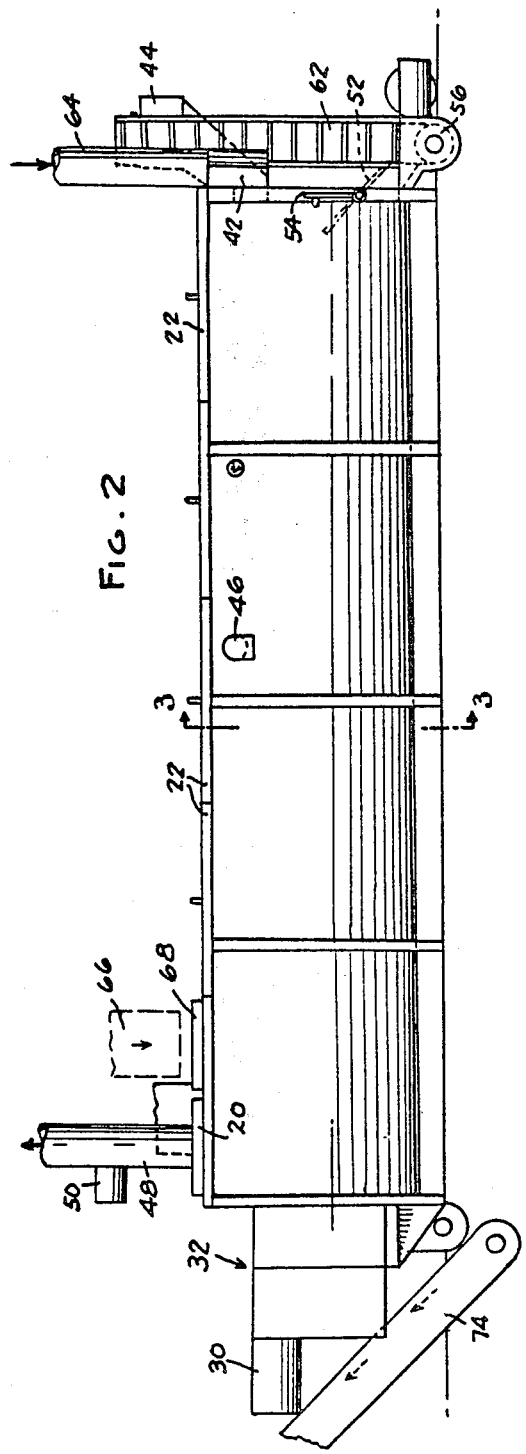
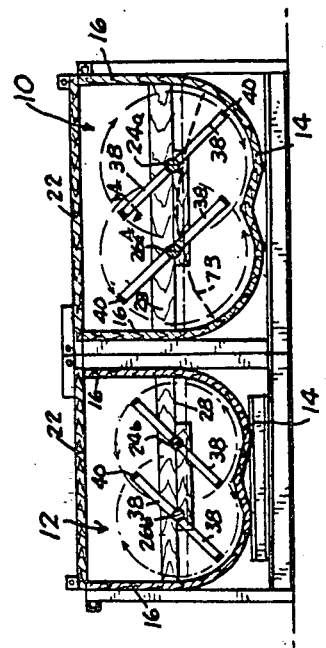
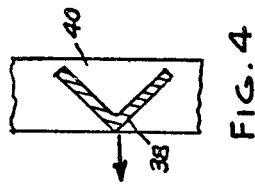

PROCESS AND APPARATUS FOR PRODUCING COMPOST

TECHNICAL FIELD

This invention relates to a method and apparatus for making compost from organic matter.

The object of this invention resides in the provision of an economical method and apparatus for producing an organic compost which is not only an excellent soil conditioner, but which, unlike most organic composts, has a relatively high fertilizer value and in certain cases is useful as an animal feed.

BACKGROUND ART

Many processes and various types of equipment have been proposed and used heretofore for making compost from animal waste. To my knowledge such equipment and processes have had one or more drawbacks or disadvantages. Some of the equipment heretofore used or proposed is extremely costly and impractical. Likewise, the prior art processes for the most part involve a relatively long period of time to complete the composting action and produce a compost having a relatively low nutrient value, especially with reference to its nitrogen content.

Organic waste is converted into compost by the process of fermentation. The waste is usually mixed with organic carbonaceous filler material and, when the mixture is agitated and aerated, the process of fermentation progresses through several states to decompose the mixture and produce the compost.

The first stage of the fermentation process is characterized by the production of and multiplication of aerobic bacteria in the presence of moisture and air. This reaction generates heat and the decomposition is then continued by thermophilic aerobic bacteria. With proper control of the moisture content and aeration, heat is generated as the mixture decomposes and the temperature of the mixture progressively rises to an optimum value. The mixture remains at this elevated temperature while the decomposition process continues for a period of time, depending upon such variable conditions as moisture content, manner and extent of aeration, and the nature of the mixture ingredients. Thereafter the mixture gradually cools. When the mixture reaches a predetermined low temperature (usually considered to be about 100° F.) the production of aerobic bacteria ceases and the reaction then becomes anaerobic where anaerobic bacteria and fungi take over and further decompose the the mixture, particularly the cellulose therein, in the presence of moisture, but without further aeration required.

I have determined that the maximum nutrient value of the compost is obtained at the completion of the aerobic thermophilic reaction, provided the reaction proceeds under optimum operating conditions. If, after the aerobic reaction is completed, the mixture is permitted to undergo an anaerobic reaction for a prolonged period of time, the nutrient value of the compost (the nitrogen content in particular) actually decreases. In accordance with the present invention the moisture content of the compost is reduced to a predetermined maximum value by drying the compost within a reasonably short period of time after the aerobic reaction is completed. As a practical matter and for reasons of economy the compost is permitted to cool to room temperature or about 100° F. in the composting chamber. The compost is then transferred to a dryer where its moisture content is reduced to less than 50% by weight and is thereafter promptly packaged in containers which are generally moisture impervious so that the anaerobic reaction is arrested and prevented from reoccurring. In this manner I have been able to produce compost having a nitrogen content as high as 18% and consistently higher than 7% from a mixture containing approximately 4% chicken manure and 60% sawdust in a period of 30 to 40 hours.

I believe that the high nutrient value of the compost and the relatively short period of time involved in producing the compost according to the present invention is also attributable to the manner and the extent to which the mixture is aerated. The aerobic thermophilic reaction is maximized when all portions of the mass are slowly aerated uniformly and to the proper extent. In order to aerate the mixture properly it is necessary to agitate the whole mass very slowly in such a manner that substantially all portions thereof are exposed to an optimum amount of air for an optimum period of time. If the mass is agitated too violently or if the amount of air is excessive, the mixture will be dried and cooled. On the other hand, if the air supplied is less than the optimum amount required or if the mass is not agitated properly the bacterial activity will not reach its maximum potential and the composting process will require an unduly long period of time. In other words, if the temperature of the mixture does not reach the maximum or optimum value to allow the reaction to progress at its maximum potential rate the process becomes a costly one and the compost will not normally have a relatively high fertilizer value.

It has been recognized in the past that agitation and aeration of the mixture is conducive to the rate at which the organic waste will be converted to compost. In the past agitation of the mixture has been accomplished by such means as horizontally reciprocating or linearly moving rakes or plows and rotary drums with or without baffles or radial fingers projecting into the mixture. With such types of equipment the proper aeration has not been achieved. For example, with rakes it is impractical, if not impossible, to agitate the mass so that the oxygen in the air will come into intimate contact with all portions thereof for the required time interval. In the case of rotary drums, some portions of the mass remain stagnant for an unduly long period of time while other portions are caused to fall or tumble rapidly through the air stream directed through the drum. In either case, substantially all portions of the mixture in the drum are not uniformly exposed to the air for the required period of time to achieve the optimum operating conditions to allow the reaction to progress at its maximum potential rate and to produce the maximum nutrient content.

DISCLOSURE OF THE INVENTION

In accordance with the present invention a mixture or organic waste and organic filler having a particular range of moisture, at least a partially particulate nature, and containing appropriate bacteria is charged into a stationary composting chamber to partially fill the chamber. Within the chamber there is arranged a pair of horizontally extending rotatable shafts. The shafts are spaced apart horizontally and each is preferably provided with two rows of radially projecting agitating fingers arranged diametrically opposite each other and spaced apart lengthwise of the shaft. The fingers on each shaft have a length such that the outer ends thereof extend closely adjacent the adjacent side wall of the chamber. The two shafts are spaced apart a distance less than twice the length of the fingers so that as the shafts rotate the paths of travel of the outer end portions of the fingers on the two shafts overlap at the central portion of the chamber between the shafts. The shafts are rotated in opposite directions so that the fingers sweep in a direction upwardly toward the longitudinal central portion of the chamber. The fingers in each row are spaced apart and the outer ends thereof are preferably interconnected by a tie bar so that, when the two shafts are rotated slowly while air is directed through the chamber, substantially all portions of the mixture are gently agitated. Portions of the mixture are progressively displaced toward the center of the chamber and slowly lifted and agitated in a manner such that substantially all portions of the mixture are uniformly and progressively exposed to the air flowing through the chamber for a desired period of time. The volume of air flowing through the chamber is adjusted to a relatively small amount such that, even though substantially all portions of the mixture are agitated slowly and exposed to the air so as to result in a relatively prolonged and intimate contact between the mixture and the air, the mixture is not cooled or substantially dried to a degree which would impair the thermophilic aerobic decomposition reaction.

BRIEF DESCRIPTION OF THE DRAWINGS

Other objects, features and advantages of the apparatus and method of the present invention will become apparent from the following description and accompanying drawings, in which:

FIG. 1 is a top plan view of the composting apparatus of this invention with at least some of the access doors at the upper end thereof removed;

FIG. 2 is a side elevational view of the apparatus shown in FIG. 1;

FIG. 3 is a sectional view taken along the line 3—3 in FIG. 2; and

FIG. 4 is a sectional view taken along the line 4—4 in FIG. 3.

BEST MODE FOR CARRYING OUT THE INVENTION

The apparatus illustrated in FIG. 1 comprises a composting chamber 10 and a drying chamber 12 which extend horizontally side by side. Each of these chambers has a bottom wall 14, side walls 16, end walls 18 and top walls 20. These walls are preferably made of wood or other material which has relatively good heat insulating properties. The major portion of the top wall of each chamber is divided into a plurality of covers or hatches 22 which are adapted to be lifted or otherwise opened to permit access to and inspection of the interior of the chambers. Within each chamber there are arranged two shafts 24, 26. These shafts are journalled at each end in the end walls 18 and are supported intermediate their ends by horizontal braces 28 extending between the side walls of the chamber at generally the vertical midportion thereof (FIG. 3). Shafts 24a and 26a in composting chamber 10 are driven by an electric motor 30 through a gear and chain drive 32. As shown in FIG. 3, shafts 24a, 26a are driven in opposite directions. Shafts 24b and 26b in dryer chamber 12 are driven by an electric motor 34 through a gear and chain drive 36. Shafts 24b and 26b can be driven in either the same or opposite directions. Each of the shafts referred to has two rows of radially extending fingers 38 thereon. As shown in FIG. 4, the fingers are preferably formed from angle iron. The two rows of fingers on each shaft are arranged diametrically opposite one another and the fingers are spaced along the shaft in a spiral fashion. Between each of the intermediate braces 28 the outer ends of fingers 38 are interconnected by spiral tie bars 40.

As shown in FIG. 3, the fingers 38 have a length such that, as the shafts are rotated, the tie bars 40 traverse a path closely adjacent the lower portion of side walls 16 and bottom wall 14. These wall portions are generally semi-circular in cross section. It will be also observed from FIG. 3 that the spacing between the shafts in each chamber is substantially less then twice the length of fingers 38 so that the paths of travel of the outer end portions of the fingers overlap substantially in the space between the shafts. In order to obtain a more or less constant agitation of the mixture in the chambers and to prevent the interference of the tie bars 40 the fingers 38 on one shaft are staggered 90° circumferentially relative to the fingers on the other shaft at any one section of a chamber. Thus, when the fingers on shaft 24a are disposed in a vertical plane the fingers on shaft 26a are disposed in a horizontal plane. In the compost chamber 10 it is important that the two shafts 24a, 26a are rotated such that the fingers tend to displace the mixture in the chamber laterally inwardly and upwardly toward the central portion of the chamber as shown in FIG. 3. Thus, as viewed in FIG. 3, shaft 24a is rotated clockwise and shaft 26a is rotated counterclockwise. Fingers 38 are spaced apart on shafts 24a, 26a a distance of between 7 to 12 inches. This spacing insures complete agitation and churning of the whole mass, which, because of its moisture content, is quite viscous, without lifting too much of the mixture as the shafts are rotated. If the major portion of the mass is simply lifted by the fingers and then permitted to fall or roll downwardly over the fingers, all portions thereof would not be brought into intimate and relatively prolonged contact with the air flowing through the chamber. It is essential, therefore, that the fingers produce a substantial churning action throughout the mixture so as to allow the air to repeatedly reach all parts thereof.

At one end thereof composting chamber 10 is provided with a manifold 42 connected with an air intake 44 for admitting air to the chamber. Depending upon the length of chamber 10, one or more additional air inlets 46 may be provided along the side walls of the chamber. At the opposite end of the chamber there is provided an air outlet duct 48 to which is connected a motor-driven fan 50 for exhausting air from the chamber. The flow of air through the chamber can be controlled by any suitable means (such as dampers or the like) or by controlling the speed of motor-driven fan 50.

The spiral arrangement of the fingers 38 on the two shafts 24a, 26a is provided to facilitate discharge of the compost from the chamber 10. When the two shafts are rotated at a proper speed the mixture is advanced toward the end of the chamber opposite the drive 32. At the discharge end of the chamber there is provided a discharge door 52 operable by a hand lever 54. When the discharge door is open and the shafts 24a, 26a are rotated at the proper speed the contents of the compost chamber are discharged into a trough 56 in which there is located a feed auger 58 driven by a motor 60. Auger 58 feeds the compost to an inclined motor-driven conveyor 62 which discharges the wet compost into one end of the drying chamber 12. At the adjacent end of chamber 12 there is provided an air inlet duct 64 and at the opposite end thereof there is provided an air outlet duct 66 in which there is located a high velocity blower (not shown). The air outlet duct discharges the air from the dryer chamber and is connected to an acid trap for absorbing the noxious gases and fumes from the discharged air.

The material to be composted is preferably entirely organic material. The material may be animal in origin, such as chicken, cow or hog manure, slaughter-house scrap or the like; animal in origin such as hay, straw, paper, cardboard, corncob, cornstalk, brewer's yeast, or the like; or mixed such as sewage sludge. The material preferably has a moisture content of 30-70% by volume. Fermentation will not proceed at a reasonable rate in material that is too dry or too moist. Additionally, the material must have some particulate content so that it will become aerated as it is churned and agitated in the compost chamber 10. In general, a minimum of about at least 5-7% of the material by volume must be of a particulate nature, as opposed to a powdery, finely divided state. Finally, the mixture must contain aerobic bacteria and a portion of the aerobic bacteria must be thermophilic. The mixture preferably also contains anaerobic bacteria.

In general, the formulation of a proper charge for the composting machine will begin with a consideration of the organic waste material that is to form the basis for the charge. If that waste consists of animal waste such as manure, it will already contain the required forms of bacteria and the balance of the charge must consist of such organic material as will provide the necessary particulate matter and bring the total moisture content within the range of about 30% to 70% by volume. Such organic filler material may typically constitute hay, straw, corncob, cornstalk, shredded paper, shredded cardboard, or sawdust. The sawdust or the corncob will provide the necessary particulate elements of the composition but if the other carbonaceous filler materials are used some sawdust or corncob or the like will have to be added to the mixture.

When the basic waste matter is vegetable in nature it may be necessary to add the necessary bacteria either directly or in the form of a certain percentage of animal waste containing the bacteria. For example, a desirable raw material for the process constitutes brewer's yeast reclaimed from a beer brewing process. Organic filler material which will absorb some of the natural excess moisture of the brewer's yeast to bring the total moisture in the batch to below 70% by volume, and will add the particulate nature required for aeration, can be added, but the resultant mixture will still be lacking in the appropriate aerobic and thermophilic aerobic bacteria. These can be directly added to the batch or added in the form of animal waste containing these materials.

The following examples of charges for the composting process are illustrative of the range of possibilities:

EXAMPLE I

One part by volume chicken manure; one part by volume sawdust or corncob. Hay, straw, shredded paper, shredded cardboard or cornstalk could be substituted for most of the sawdust and a small proportion of sawdust or corncob would have to be added to provide the required 5-7% by volume of particulate material.

EXAMPLE II

One part by volume sewer sludge; one part sawdust. The sawdust is preferably ¼ inch sieve size or larger. The sewer sludge contains the required bacteria.

EXAMPLE III

One part by volume brewer's yeast refuse from a beer brewing process with about 90% by volume moisture content; one part manure; one part sawdust and one part hay. The animal waste provides the necessary bacteria and the hay and the sawdust absorb the excess moisture from the brewer's yeast to bring the total moisture volume under 70%, and the sawdust provides the necessary particulate matter.

EXAMPLE IV

Forty percent by volume produce waste (produce waste consists of scrap green vegetables and the like); 20% manure; 40% organic filler including at least 15% particulate matter.

EXAMPLE V

One part paunch; i.e., the rumen or second stomach of cows are obtained from a slaughterhouse, typically with each stomach containing 40 to 50 pounds of undigested vegetable matter; 1½ parts by volume sawdust.

Chamber 10 is preferably filled to a level just below the cross braces 28, this level being indicated by the broken line 70 in FIG. 3. After the compost chamber is so loaded covers 22 and hatch 68 are closed and the flow of air and rotation of shafts 24, 26a are initiated. I have found that by utilizing mixtures as described above excellent results are obtained when shafts 24a, 26a are rotated at between 1 revolution per minute and 1 revolution every 6 minutes. Preferably with a mixture containing about 40% chicken manure and the balance sawdust the shafts are rotated 1 revolution every 4 minutes. At the same time, it is important that the air flowing through the compost chamber is controlled in relation to the unit volume of the mixture in the compost chamber. I have found, for example, that, depending upon the nature of the mixture, the air flowing through the chamber should equal at least about ¼ cubic foot per minute (CFM) per ton, but should not exceed about 1 CFM per ton. The amount of air will vary between these limits depending upon its temperature and the moisture content and the nature and proportions of the manure and sawdust. With a mixture comprising 40% chicken manure and 60% sawdust and having a moisture content of about 80% by weight, or 40-50% by volume, I have found that the optimum air flow should be about ½ CFM per ton. A ton of said mixture will vary in volume between about 1½ to 1¾ cubic yards, depending upon the mixture proportions and its moisture content. Accordingly, the air flow rates referred to may be considered to be a minimum of about ½ to 2¼ CFM per 100 cubic feet of mixture in the chamber. With the specific mixture and moisture content referred to above the preferred air flow rate is about b 1 CFM per 100 cubic feet of mixture.

When the composter is operated under these conditions and the air admitted is at room temperature (at least 65° F.), the temperature of the mixture will gradually rise to between about 210° to 240° F. and on the average to about 225° F. in a period of about 14 to 18 hours. The mixture will remain within this temperature range for about 8 to 10 hours. Thereafter the temperature of the mixture will gradually decrease in about 8 to 9 hours to room temperature or at least to about 100° F., at which time the speed of rotation of the shafts 24a, 26a increased to advance the material in the compost chamber and discharge it through door 52.

When shafts 24a, 26a are rotated at the relatively slow speeds mentioned, the relatively wet mixture in the compost chamber is thoroughly and slowly agitated. The fingers on each shaft rotate downwardly through the mixture along the outer sides of the compost chamber and then upwardly in the space between the two shafts to gently churn the entire mixture. Since the fingers on the two shafts are offset circumferentially 90°, the fingers tend to lift and displace some of the mixture laterally first in one direction and then laterally in the opposite direction so that the top of the mass assumes the configuration designated by broken line 72 in FIG. 3. This gently are repeated agitation causes substantially all portions of the mixture to be repeatedly brought into intimate and relatively prolonged contact with the air. However, the volume of air flowing through the chamber is relatively small. Thus, there is no tendency for the air to cool the mixture, and, since the compost chamber is formed of a material such as wood having good heat insulating properties, the mixture is capable of being heated to the relatively high temperatures referred to (210° to 240° F.) solely by the bacterial reactions occurring in the fermentation process.

Thus, by controlling the rate at which the mixture is agitated and the rate at which the air flows through the composter within the aforesaid limits, I have been able to produce a compost within a relatively short period of time having a relatively high nutrient value. For example, when the mixture contains about 40% chicken manure and about 60% sawdust, under normal operating conditions the composting action is completed within a period of as little as 30 hours and the compost will have a nitrogen content in excess of 7%, phosphorus about 3½% and potassium about 4 to 4½%. This nutrient content is maintained provided the compost is dried within a reasonably short period of time after its temperature in the compost chamber starts to decrease. Thus, the mixture will normally cool from the maximum temperature attained in the composting chamber (210° to 240° F.) down to about 100° F. or less in about 8 to 9 hours. If the compost so produced is then promptly subjected to a drying operation (within a matter of 2 or 3 hours), I have found that its nutrient content (particularly nitrogen) is not substantially diminished.

In order to prevent the initiation of the anaerobic reaction to any substantial extent following the aerobic reaction, it is necessary to reduce the moisture content of the compost to less than 50% by weight. Normally when the composting is completed in the composting chamber it will have a moisture content of 55 to 65% when chicken manure is used and slightly less with cow manure. This moisture content can be reduced to less than 50% in the drying chamber 12 within a period of not more than 4 hours. However, other drying apparatus can be employed if desired. In the drying chamber 12 the two shafts 24b, 26b are rotated at approximately 25 RPM and air is directed through the chamber in a relatively high volume. The air admitted to the drying chamber is preferably at room temperature and in no event should it be hotter than about 120° F. If the temperature of the drying air exceeds about 120° F. it will promote the initiation of the anaerobic reaction which will tend to reduce the nutrient content of the finished product. After the moisture content of the compost in the drying chamber has been reduced to less than 50% by weight, a discharge door (not shown) at the drive end of the drying chamber is opened and the dried compost is discharged to a conveyor 74. Conveyor 74 conveys the dried compost to a pulverizer (not illustrated). After the compost is pulverized it is promptly packaged in plastic bags to prevent it from reabsorbing moisture which would tend to promote anaerobic decomposition. It will be appreciated, however, that, after the material is once dried, it will not reabsorb moisture at a rapid rate. Thus, if it is simply stockpiled, after a period of days or even several weeks only the outermost layer of the stockpile will have absorbed a sufficient amount of moisture to appreciably decrease the nutrient content thereof.

While there is shown and described herein a specific form of composter and a specific form of dryer, it should be appreciated that these represent merely preferred embodiments. As mentioned previously, the function of the dryer is to reduce the moisture content of the composted material to below 50% rapidly by means of air at a temperature of not more than about 120° F. Consequently, most any type of air dryer which is capable of drying the compost within a reasonable period of time may be employed. With respect to the composter, I believe it is essential to employ two counter-rotating shafts with radially projecting fingers thereon. However, the number of fingers on the shafts, the spacing between the fingers, and the number of rows of fingers are not critical. As pointed out previously, the function of the fingers is to agitate and churn the mass slowly and more or less constantly so that all portions of the mixture are repeatedly brought into intimate and relatively prolonged contact with the air. While the utilization of two rows of fingers is preferred, it will be appreciated that more than two rows can be employed. For example, if four rows of fingers were employed on each shaft in composting chamber 10, then the speed of rotation of the shafts would be half of those stated above and the air flow would remain at the same rate as stated.

The resulting compost can be used as a soil conditioner or fertilizer or as an additive for animal feed. For example, when the composter is charged with hog manure and fertilizer, the resulting compost can be re-fed to the hogs as a protein replacement at a rate in the range of one pound per day per hod.

The high protein compost product may also be used as a soil for raising mushrooms.

I claim:

1. The method of producing a fermented product in a horizontally elongated chamber having a pair of rotatable shafts therein journalled on generally horizontally extending parallel axes which are spaced apart in a horizontal plane, each shaft having at least one row of radially projecting fingers thereon spaced along the axis of each shaft, said fingers being located and dimensioned relative to said chamber and the spacing of said shafts so that substantially the entire contents of the chamber are agitated by the churning and lifting action of the fingers when the shafts are rotated, which comprises:

(a) loading into said chamber a batch of organic matter containing bacteria, said batch being of a predetermined volume such as to only partially fill said chamber and thereby provide a substantial air space throughout the length of the chamber above the level of the batch mixture therein;

(b) after loading, isolating said chamber from the surrounding atmosphere except for the hereinafter mentioned air flow;

(c) rotating the two shafts in opposite directions so that the fingers thereon travel through the mixture in a direction which tends to displace it from the opposite longitudinal sides of the chamber laterally inwardly and upwardly toward the longitudinal central portion of the chamber;

(d) rotating the shaft at a rate such that the mixture is progressively agitated by the circumferentially successive rows of fingers on each shaft about once every three minutes but not more than about once every one-half minute to thereby cause substantially all portions of the mixture to progressively come into intimate and relatively prolonged contact with the hereinafter mentioned air;

(e) while said shafts are rotating, conducting fresh air over the mixture through the entire length of said chamber at a rate between about ½ to 2¼ cubic feet per minute per hundred cubic feet of the batch mixture in the chamber thereby causing fermentation of the mixture to proceed at such rate as to raise the temperature of the mixture to about 210 degrees Fahrenheit within a period of not more than about 18 hours without the application of external heat;

(f) continuing the flow of air and rotation of said shafts at said rates while and after the temperature thereof levels off at said elevated value to cool the moist fermented product so formed to relatively low temperature approaching room temperature;

(g) drying the cooled moist product so formed using drying air of a temperature not exceeding 120 degrees Fahrenheit to reduce its moisture content to a maximum of not more than about 50% by weight within a reasonably short time after the aerobic reaction is completed and before substantial anaerobic decomposition of the fermented product occurs; and (h) maintaining substantially the entire batch of said product in said dried condition until it is ready for use.

2. The method called for in claim 1 wherein the air is conducted through the chamber at about 1¼ cubic foot per minute per 100 cubic feet of mixture.

3. The method called for in claim 1 wherein the air admitted to the chamber is maintained at a temperature of at least about 65° F.

4. The method called for in claim 1 wherein the moist fermented product is cooled to a temperature of not more than about 100° F. after its temperature levels off at said elevated value.

5. The method called for in claim 1 wherein each shaft has two diametrically opposed rows of teeth thereon and the shafts are rotated between about 1 and 1/6 r.p.m.

6. The method called for in claim 5 wherein the shafts are rotated at about ¼ r.p.m.

7. The method of claim 1 wherein the organic matter contains 30–70% by volume of water and at least about 5% of particulate matter.

8. The method of claim 1 wherein the organic matter includes animal waste.

9. The method of claim 8 wherein the animal waste includes manure.

10. The method of claim 9 wherein the organic matter includes sawdust.

* * * * *

UNITED STATES PATENT AND TRADEMARK OFFICE
CERTIFICATE OF CORRECTION

PATENT NO. : 4,411,682
DATED : October 25, 1983
INVENTOR(S) : Joseph H. Brill

It is certified that error appears in the above-identified patent and that said Letters Patent are hereby corrected as shown below:

Column 2, line 9, "4%" should be --40%--.

Column 6, line 25, "are" should be --as--.

Column 6, line 60, please delete "b".

Column 7, line 18, "gently are" should be --gentle and--.

Signed and Sealed this

Tenth Day of January 1984

[SEAL]

Attest:

GERALD J. MOSSINGHOFF

Attesting Officer

Commissioner of Patents and Trademarks